United States Patent Office 2,956,574
Patented Oct. 18, 1960

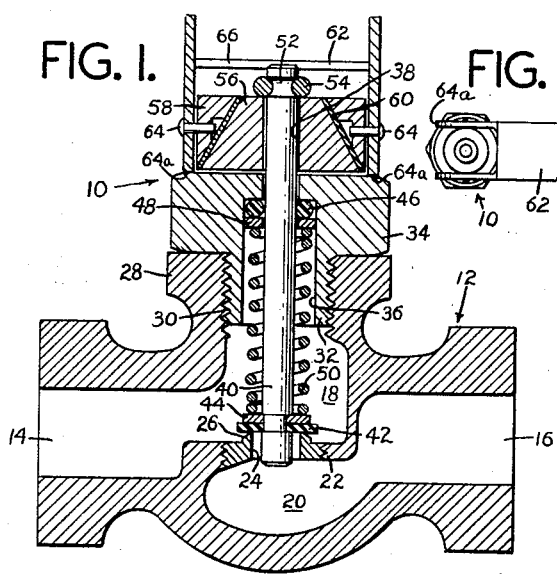

2,956,574
FUSIBLE VALVE
Herbert M. Cowan, 9 Elbert Ave., Bellmore, N.Y.
Filed July 11, 1955, Ser. No. 520,990
1 Claim. (Cl. 137—77)

This invention relates to a manually controlled fusible valve.

The fusible valve to which the present invention relates may either be normally open or normally closed. For example, if used in a sprinkler system for use against fires in large commercial buildings, it would be normally closed. If used in a fuel line supplying oil burners or gas burners or the like, it would be normally open. In the first case, rupture of the fusible element would cause the valve to open and in the second case rupture of the fusible element would cause it to close. In either case, the valve is manually controlled so that it may be opened or closed manually without disturbing the fusible element.

An important feature of this invention is the nature of the fusible element. In conventional fusible valves, the fusible element comprises a washer or sleeve which is made of fusible metal such as an alloy of lead, tin, cadmium and bismuth. Illustrative is Wood's alloy which consists of seven to eight parts of bismuth, four of lead, two of tin and one to two parts of cadmium. Its melting temperature is 160 degrees Fahrenheit. Substantially the entire block of metal must fuse or melt in order to enable the valve to function. In the present invention, on the other hand, the fusible element is simply a thin film which serves as a bond between two tapered or conical members. These two members are situated in nesting relation to each other and they are normally prevented from moving axially away from each other by the thin film of fusible metal which bonds them together. When this thin film fuses or melts, the slightest axial movement of one of these conical elements relative to the other is sufficient to free it completely therefrom and to enable the valve to function.

Another important feature of this invention is the quick-acting manual control device which may be used to open or close the valve without rupturing the fusible element. This control device consists of a pivotally mounted lever or handle which has a pair of cam formations thereon. When said lever or handle is flipped in one direction about its pivotal axis, the cam formations act against a fixed member to move the valve closure member in one direction against spring action to either open or close the valve, depending upon how it was set. When the lever or handle is flipped in the opposite direction about its said axis, the cam formations progressively disengage said fixed member and the spring element is thereby enabled to return the valve closure member to its original position. To facilitate manual operation of the valve, one side of the lever or handle is marked "open" and the other side is marked "closed" or "shut" or the like. Consequently, one need only read the notation on said lever or handle which is exposed to view to ascertain whether the valve is in open or closed position.

Still another feature of this invention is the provision of a fusible valve of the character described which may be used either normally closed or normally open, without changing any of its parts and by simply inverting the position of the valve seat. In this valve, the valve seat is screwed into the valve housing. When it is screwed into said housing to face in one direction, the valve may be used as a normally open valve. When the seat is screwed into the valve housing to face in the opposite direction, the valve may be used as a normally closed valve.

The invention is illustrated in the accompanying drawing wherein:

Fig. 1 is a sectional view through a fusible valve made in accordance with this invention, said valve being normally open but being shown in closed position.

Fig. 2 is a side view of said valve.

Fig. 3 is a top view thereof.

Fig. 4 is another sectional view through the same valve, showing it in open position.

Fig. 5 is a fragmentary side view of said valve with its manual control lever pivoted 180 degrees from its Fig. 2 position to open the valve as shown in Fig. 4.

Fig. 6 is a view similar to that of Fig. 3 but showing the control lever in open position.

Fig. 7 is a sectional view of a normally closed valve made in accordance with this invention.

Referring now to the first six figures of the drawing, it will be observed that fusible valve 110 is provided with a housing 12 which has a pair of axially aligned ports or passages 14 and 16 respectively for the fluid which is to pass therethrough. Either port may be the inlet port or port of entry and either may be the outlet port. Port 14 communicates with a valve chamber 18 and port 16 communicates with a lower chamber 20. A partition 22 is disposed between these two chambers and an opening 24 in said partition provides communication between said chambers. An annular shoulder 26 is formed on partition 22 in concentric relation to opening 24 and said shoulder serves as the seat of the valve.

A tubular portion 28 projects upwardly from housing 12, intermediate its ends. This tubular portion is provided with internal screw threads 30 to receive an external threaded member 32. This externally threaded member has a relatively large head 34 which abuts the tubular extension 28 of housing 12. Threaded member 32 is tubular and its head 34 is recessed to communicate therewith and a cylindrical space 36 is thereby formed within said threaded member 32 and its head 34. A hole 38 is formed at the top of said head 34 for communication with space or chamber 36 and it is through said hole 38 and said chamber 36 that the stem 40 of the valve closure member extends. A resilient washer 42 is secured to the lower end of stem 40 and immediately above it is a metal washer 44. At the upper end of chamber 36 is an annular washer 46 and below it is a metal washer 48. Annular washer 46 is, preferably, an O-ring which is made of resilient material such as natural or synthetic rubber. A coiled compression spring 50 encircles stem 40 and its upper end bears against washer 48 while its lower end bears against washer 44. Its action is downward and it acts to thrust the stem downwardly so as to bring its resilient washer 42 into engagement with valve seat 26 to close the valve.

An annular groove 52 is formed at the top end of valve stem 40 to accommodate a ring 54. Slidably mounted on said valve stem below said ring 54 is a conical member 56. This conical member is formed in the shape of a truncated cone with its larger end facing downwardly and its smaller end facing upwardly. Surrounding said conical member 56 is a tapered ring 58 whose inner surface is conical to receive the conical member 56. In other words, tapered ring 58 has a conical opening formed therein, the smaller end being at the top and the larger end at the bottom. It will be noted that a thin film 60 of fusible metal of the general character above mentioned is disposed between the conical surfaces of the two members 56 and 58. The thickness of this film should be sufficient to bond these two members together and no greater thickness is required. For example, a thickness of a sixty-fourth of an inch would be ample and so would half such thickness. Actually, all that is needed is a thin film of capillary thickness.

A lever or handle 62 is pivotally secured to tapered ring 58 by means of a pair of pins or rivets 64. This handle 62 has a pair of side walls with cam edges 64a and it also has an end piece 66 which serves as the handle proper. On one side of said extension piece 66 is printed the word "Shut," see Fig. 3, and on the opposite side is printed the word "Open," see Fig. 6. The cam edges 64a are adapted to ride against head 34 above mentioned. One position is shown in Fig. 2 and another position is shown in Fig. 5.

It will be observed that conical member 56 abuts ring 54 and said ring serves as a stop member relative thereto. When lever or handle 62 is in its Fig. 1 and Fig. 2 position, cam edges 64a engage head 34 at their shortest radial distance to pins 64. This means that spring 50 is permitted to push downwardly upon washer 44 to bring stem 40 to its lowermost position with its washer 42 in engagement with valve seat 26. When the lever or handle 62 is swung in counter-clockwise direction as viewed in Figs. 2 and 5, from its Fig. 2 position to its Fig. 5 position, its cam edges 64 reach and pass their maximum radial distances from said pins 64 and the effect of such action is to cam the tapered ring 58 upwardly to its Fig. 4 position. Since this tapered ring is bonded to the conical member 56 by means of fusible film 60, the entire unit consisting of tapered ring 58 and film 60 and conical member 56 is elevated to its Fig. 4 position. Since the conical member 56 abuts ring 54, this will have the further effect of pushing valve stem 40 upwardly against the action of spring 50 to move washer 42 out of engagement with the valve seat 26 and thereby to open the valve.

Should heat be applied to the fusible film 60, as when a fire occurs in the general vicinity of the valve, said film will melt and the bond between conical member 56 and tapered ring 58 will thereby be broken. Conical member 56 is now free to move relative to the tapered ring 58 which is held in elevated position by the handle or lever 62 as shown in Fig. 4. Spring 50 is therefore rendered free to thrust washer 42 downwardly into engagement with the valve seat since the valve stem is now free to move in the same direction. This closes the valve.

It will be understood that the valve last above described may be used wherever it is desired to stop the flow of a fluid in the presence of heat. For example, this valve may be installed in fuel lines leading from a source of fuel to a device which uses fuel, such as an oil burner or a gas heater or the like. It will now be noted that valve seat 26 is an externally threaded ring which is screwed into a tapped hole in partition 22. It will be understood that the valve seat may be positioned in said tapped hole either to face upwardly as shown in Figures 1 and 4 or to face downwardly. In other words, the valve seat is removable and invertible. Should it be desired to install a normally closed valve, as in a fire sprinkler system, valve 70 shown in Fig. 7 may be used. This valve is substantially like valve 10 above described but its valve seat faces downwardly instead of upwardly as is the case with valve 10. Thus valve 70 has a housing 72 which corresponds to housing 12 and it has a screw-threaded valve seat 74 in tapped hole 76 formed in partition 78, said valve seat 74 facing downwardly instead of upwardly as is the case with valve seat 26.

Valve stem 80 may be relatively long, as compared to valve stem 40 above described and it may be provided with a pair of annular grooves 82 and 84 at its upper end. A ring 86 may be mounted in either of these grooves, in the upper groove 82 when the valve is to be used as a normally closed valve and in the lower groove 84 when it is to be used as a normally open valve. At its lower end, valve stem 80 is provided with a head 88 supporting a washer 90 and a resilient washer 92. All of the rest of the mechanism is precisely as shown in the first six figures of the drawing.

It will be noted that compression spring 94, corresponding to spring 50, bears downwardly upon washer 92 and tends to thrust the valve stem 80 downwardly to disengage washer 92 from the valve seat in order to open the valve. Such downward movement corresponds to the downward movement of valve stem 40 from its Fig. 4 position to its Fig. 1 position, the only difference being that such downward movement of stem 80 opens the valve whereas the downward movement of stem 40 closes it.

It will be observed that insert 74 may be inverted in position from that shown in Fig. 7. In such case, the lower end of valve stem 80 would be retracted to a position above said insert, instead of below it, as shown in Fig. 7. Furthermore, resilient washer 92 would be placed below washer 90, instead of above it as shown in Fig. 7, so that spring 94 would bear against washer 90. Similiarly, ring 86 would be placed in groove 84 in valve stem 80 instead of in groove 82. The reason for this is that since the lower end of the valve stem will be disposed above the valve seat insert 74, and consequently it would be necessary to lower ring 86 on said valve stem so that it will be in abutment with conical member 56. Valve 70 would now function as a normally open valve, and in such case valve 70 would correspond substantially to valve 10 above described except for the structural and dimensional differences between their respective stems 80 and 40.

When valve 70 functions as a normally closed valve as shown in Fig. 7, melting of its fusible element 60 will enable spring 94 to push the valve stem downwardly into open position, thereby opening the valve. When valve 70 is used as a normally open valve, that is, with the lower end of its valve stem normally positioned above the valve seat 74, rupture of fusible element 60 will enable the spring to thrust the valve stem downwardly to bring its washer 92 into engagement with the valve seat and thereby to close the valve.

An important feature of the valves shown in the drawing is the off-center position of the high spot 100 on the two cam edges 64a of the cam handles. It will be noted that this high spot 100 is situated laterally of the pivotal axis of pins or rivets 64, to the right as viewed in Fig. 5. Consequently, the downward force which the spring exerts upon the valve stem will tend to lock the handle in its Fig. 5 position.

The foregoing is illustrative of preferred forms of this invention and it will be understood that these preferred forms may be modified and other forms may be provided within the broad spirit of the invention and the broad scope of the claim.

I claim:

A fusible valve of the character described, comprising a valve housing having an inlet port and an outlet port, a horizontal partition in said valve housing between said inlet and outlet ports, an opening in said partition providing communication between said inlet and outlet ports, a valve seat situated on said partition at said opening, a valve closure member comprising a valve stem and a washer at the lower end of said stem, said stem being mounted in an upwardly extending portion of said valve housing for axial movement in one vertical direction to bring its washer into engagement with the valve seat to close the valve and in the opposite vertical direction to disengage said washer from sail valve seat to open the valve, a spring acting between said washer and said upwardly extending portion of the housing to urge the stem to move axially downwardly, a first conically tapered member mounted on the upper end of said stem, a second complementarily conically tapered member mounted on said first tapered member, said tapered members being coaxial with each other and with said stem, a fusible bond between the two tapered members, said valve seat being reversibly positionable in said partition to face in either upward or downward direction, said valve stem being axially movable to position its washer above the valve seat when said seat faces in upward direction and below said valve seat when it faces in downward direction, said spring being adapted to urge the valve stem downwardly to bring its said washer into closing engagement with said valve seat when the washer is positioned above the seat, and being adapted to urge the valve stem downwardly to disengage its washer from the valve seat when the washer is positioned below said seat, and a handle which is pivotably mounted on the second tapered member, said handle having a cam formation which acts against said valve housing when the handle is pivoted in one direction to pull said tapered members and the valve stem upwardly against the spring when the washer is positioned above the valve seat to disengage said washer from said seat, and said handle being pivotable in the opposite direction to lessen the pressure of the cam formation on the valve housing in order to free the valve stem for downward movement responsive to the spring action when the washer is positioned below the valve seat and thereby to permit disengagement of said washer from said valve seat.

References Cited in the file of this patent

UNITED STATES PATENTS

| | | |
|---|---|---|
| 14,429 | Woodbury | Mar. 11, 1856 |
| 325,989 | Stearns | Sept. 8, 1885 |
| 606,867 | Hoover | July 5, 1898 |
| 679,543 | Root | July 30, 1901 |
| 1,200,668 | Swanberg | Oct. 10, 1916 |
| 1,284,063 | Davis | Nov. 5, 1918 |
| 1,498,024 | Fant | June 17, 1924 |
| 1,694,242 | Wheaton | Dec. 4, 1928 |
| 1,825,543 | Redding | Sept. 29, 1931 |
| 2,035,497 | Morse | Mar. 31, 1936 |
| 2,128,059 | Siegert | Aug. 23, 1938 |
| 2,305,438 | Michaels | Dec. 15, 1942 |